United States Patent
Fabian et al.

(10) Patent No.: US 7,846,593 B2
(45) Date of Patent: *Dec. 7, 2010

(54) HEAT AND WATER MANAGEMENT DEVICE AND METHOD IN FUEL CELLS

(75) Inventors: Tibor Fabian, Mountain View, CA (US); Shawn Litster, Stanford, CA (US); Juan G. Santiago, Stanford, CA (US); Cullen Bule, Palo Alto, CA (US); Jun Sasahara, Kawagoe (JP); Tadahiro Kubota, Asaka (JP)

(73) Assignees: The Board of Trustees of the Leland Stanford Junior University, Palo Alto, CA (US); Honda Motor Co., Ltd, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/807,228

(22) Filed: May 24, 2007

(65) Prior Publication Data

US 2008/0032169 A1    Feb. 7, 2008

Related U.S. Application Data

(60) Provisional application No. 60/808,493, filed on May 25, 2006.

(51) Int. Cl.
*H01M 8/00* (2006.01)
(52) U.S. Cl. .............. 429/414; 429/434; 429/450; 429/517; 427/115
(58) Field of Classification Search .............. None
See application file for complete search history.

(56) References Cited

U.S. PATENT DOCUMENTS

| | | | |
|---|---|---|---|
| 4,185,131 A * | 1/1980 | Goller et al. | 427/113 |
| 4,444,851 A * | 4/1984 | Maru | 429/26 |
| 4,826,741 A | 5/1989 | Aldhart et al. | |
| 5,534,363 A | 7/1996 | Sprouse et al. | |
| 6,146,780 A * | 11/2000 | Cisar et al. | 429/34 |
| 6,447,945 B1 * | 9/2002 | Streckert et al. | 429/34 |
| 6,960,404 B2 | 11/2005 | Goebel | |
| 2006/0240312 A1 | 10/2006 | Xie et al. | |
| 2007/0015035 A1 | 1/2007 | Izenson | |

* cited by examiner

*Primary Examiner*—Robert Hodge
(74) *Attorney, Agent, or Firm*—Lumen Patent Firm

(57) ABSTRACT

A method and device for fuel cell heat and water management is provided. A thermally and electrically conductive hydrophilic heat and mass transport element is provided to the fuel cell spanning from inside to outside the cell. The transport element is deposited between current collector and gas diffusion layers, where heat is transported along the transport element from an interior portion of the element inside the cell to an exterior portion of the element outside the cell. Liquid water is transported along the element into or out of the cell, and heat is removed from the exterior portion by any combination of radiation, free convection and forced convection, and where the liquid water is removed from the exterior portion by any combination of convection driven evaporation and advection. The water is added to the cell from the exterior to the interior by any combination of advection and capillary wicking.

16 Claims, 8 Drawing Sheets

HEAT AND WATER MANAGEMENT DEVICE AND METHOD IN FUEL CELLS

CROSS-REFERENCE TO RELATED APPLICATIONS

This application is cross-referenced to and claims the benefit from U.S. Provisional Patent Application 60/808,493 filed May 25, 2006, which is hereby incorporated by reference.

FIELD OF THE INVENTION

The invention relates generally to fuel cells. More particularly, the invention relates to fuel cells with thermally and electrically conductive wicking elements spanning from inside to outside the fuel cell for heat and water management.

BACKGROUND

Heat and water management in fuel cells is a necessary aspect to attaining better cell efficiency and longevity. For proton exchange membrane (PEM) fuel cells with perfluorosulfonic acid (PFSA) type membranes, such as Nafion®, water management is a persistent challenge, where PEM fuel cells generally require high water activity for suitable ionic conductivity. Typically, humidification of the reactant gases ensures the proper humidification of the membrane. The oxygen reduction reaction at the cathode of a PEM fuel cell produces water in liquid form. Liquid water fills the pores of the catalyst layer and gas diffusion layer (GDL) and restricts diffusion of oxygen to the catalyst. The liquid water emerges from the GDL via capillary action, accumulates in gas channels, covers the GDL surface, increases the pressure differentials along flow field channels, and creates flow maldistribution and instability in systems with multiple parallel channels.

A common strategy to mitigate flooding is to employ serpentine channels (most commonly a small number of serpentine channels in parallel) for the cathode and to supply air flow rates large enough to force liquid water out of the system. These strategies act in concert as serpentine designs increase flow rate per channel, improving the advective removal of water droplets. Air is often supplied at a rate several times greater than that required by the reaction stoichiometry, increasing the oxygen partial pressure at the outlet. The larger applied pressure differentials required for these designs further reduce flooding since pressure drop reduces local relative humidity, favoring increased evaporation rates near the cathode outlet. The use of high flow rate and high pressure contributes to air delivery being one of the largest parasitic loads on fuel cells. Miniaturization of forced air fuel cells exacerbates this parasitic load issue as the efficiency of miniaturized pumps and blowers is typically much lower than that of macroscale pumps. The flooding challenge is exacerbated in planar air-breathing fuel cells where water removal from the cathode by forced convection is not applicable.

Parallel channels can reduce the pressure differential across the flow field by orders of magnitude compared to serpentine channels. A parallel channel design also simplifies flow field machining and can enable novel fabrication methods. However, truly parallel channel architectures are typically impractical as they are prone to unacceptable non-uniformity in air streams and catastrophic flooding. Typically, oxygen stoichiometries greater than 4 are necessary to prevent parallel channel flooding. Further, in-situ and ex-situ visualizations show that considerable flooding occurs in the GDL directly under the rib of the flow field irrespective of current density.

Several passive water strategies employ additional components to mitigate flooding. For example, a composite flow field plate was fabricated featuring a thin water absorbing layer and waste channels for removing liquid water from the oxidant channels. The design, however, did not offer improved power density due to a significant increase in the Ohmic losses introduced by the new components.

Active water management strategies in which applied pressure differentials actively transport liquid water out of or into a fuel cell are now emerging. A PEM fuel cell was presented that actively managed the water content of the electrolyte by supplying pressurized water to wicks that were integrated into the membrane. Further presented was an active water management method having a bipolar plate that is porous and has internal water channels for cooling and water removal. An applied pressure differential between the gas and water streams drives liquid water from the air channels and into internal channels dedicated to water transport.

Accordingly, there is a need to develop a passive heat and water management device and method for fuel cells that minimizes parasitic energy losses.

SUMMARY OF THE INVENTION

The current invention provides a device and method of in-plane fuel cell heat and water management. The method includes providing a thermally and electrically conductive hydrophilic heat and mass transport element to the fuel cell that spans from inside to outside of the fuel cell. A current collector layer is disposed in the fuel cell, where the transport element transports electrical current to the current collector layer. Further, a gas diffusion layer is provided in the fuel cell, where the transport element is deposited between the current collector layer and the gas diffusion layer. According to the invention, heat is transported along the transport element from an interior portion of the transport element inside the cell to an exterior portion of the element outside the cell. Additionally, liquid water is transported along the element into or out of the cell. Accordingly, heat is removed from the exterior portion by any combination of radiation, free convection and forced convection, and the liquid water is removed from the exterior portion by any combination of convection driven evaporation and advection. Additionally, the water is added to the cell from the exterior portion to the interior portion by any combination of advection and capillary wicking.

In one aspect of the invention, the fuel cell can be a fuel cell stack or a planar fuel cell. In a further aspect, at least two of the transport elements of the fuel cell stack are thermally and hydraulically coupled.

In another aspect of the invention, at least a portion of the transport element is made from a material such as boron nitride, aluminum nitride, copper, aluminum, nickel, alloys, graphite, expanded graphite, graphite cloth, graphite paper, aluminum foam, stainless steel foam, nickel foam, polyvinyl alcohol foam, glass microfibers, wool cloth, cotton paper, cotton cloth, polyurethane foam, cellulose acetate, polyvinyl pyrrolidone, and polyacrylamide.

Additionally, the transport element can include a liquid water transport structure such as channels inside the transport element, channels on a surface of the transport element, or an interconnected network of pores throughout the transport element.

In a further aspect of the invention, the transport element further has a pattern of water permeable and gas impermeable barrier material impregnated to the transport element that prevents communication of internal fuel cell gasses with ambient gasses. Such barrier patterns can be formed by a patterning process such as inkjet printing, screen printing, or masking. In one aspect, the barrier material can be a water permeable polymer.

In another aspect of the invention, the transport element can be a separate layer disposed between layer pairs that may include an anodic gas diffusion layer and an anodic current collector layer pair, and a cathodic gas diffusion layer and a cathodic current collector layer pair. Further, at least part of the transport element layer can be electrically conductive, where part of the element is electrically insulating. Additionally, the transport element layer has at least one cutout in the layer, where the cutout enables gas communication through the layer in a direction perpendicular to a plane of the layer. Further, the transport element layer can have at least one hydrophobic region in the layer, where the hydrophobic region enables gas communication through the layer in a direction perpendicular to a plane of the layer. The hydrophobic region can be formed by a patterning process such as inkjet printing, screen printing, or masking.

In another aspect of the invention, the transport element can be integrated to a current collector, where the current collector can be an anodic current collector or a cathodic current collector.

In a further aspect, the transport element has a heat transport portion and a water transport portion. Additionally, the transport element can form a part of a current collector flow field, where the current collector flow field can be an anodic flow field or a cathodic flow field.

In yet another aspect of the invention, the transport element transports water from a cathode of the fuel cell to an anode of the fuel cell.

In a further aspect, the transport element is an electrically conductive hydrophilic element enveloping a current collector layer.

In another aspect, the invention is an in-plane fuel cell heat and water management device having a thermally and electrically conductive hydrophilic heat and mass transport element, where the transport element spans from inside cell to outside of the fuel cell. The device further has a current collector layer in the fuel cell, where the transport element transports electrical current to the current collector layer. Additionally, the device includes a gas diffusion layer in the fuel cell, where the transport element is deposited between the current collector layer and the gas diffusion layer. Here, heat is transported along the transport element from an interior portion of the element inside the cell to an exterior portion of the element outside the cell, and liquid water is transported along the element into or out of the fuel cell. Heat is removed from the exterior portion by any combination of radiation, free convection and forced convection, and the liquid water is removed from the exterior portion by any combination of convection, driven evaporation and advection, where the water is added to the cell from the exterior portion to the interior portion by any combination of advection and capillary wicking. In one aspect of the invention, the transport element further has a pattern of water permeable and gas impermeable barrier material impregnated to the transport element that prevents communication of internal fuel cell gasses with ambient gasses, where the barrier pattern is formed by a patterning process such as inkjet printing, screen printing, and masking.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

The current invention provides a device and method of fuel cell heat and water management for redistributing and removing excess water and heat. The invention includes a thermally and electrically conductive hydrophilic heat and mass transport element integrated to the fuel cell, where the transport element spans from inside to outside of the cell. Further, a current collector layer is disposed in the fuel cell, where the transport element transports electrical current to the current collector layer. The transport element is deposited between the current collector layer and a gas diffusion layer. According to the invention, heat is transported along the transport element from an interior portion of the transport element inside the cell to an exterior portion of the element outside the cell. Additionally, liquid water is transported along the element into or out of the cell. Accordingly, heat is removed from the exterior portion by any combination of radiation, free convection and forced convection, and the liquid water is removed from the exterior portion by any combination of convection driven evaporation and advection. Additionally, the water is added to the cell from the exterior portion to the interior portion by any combination of advection and capillary wicking.

Figure 1:
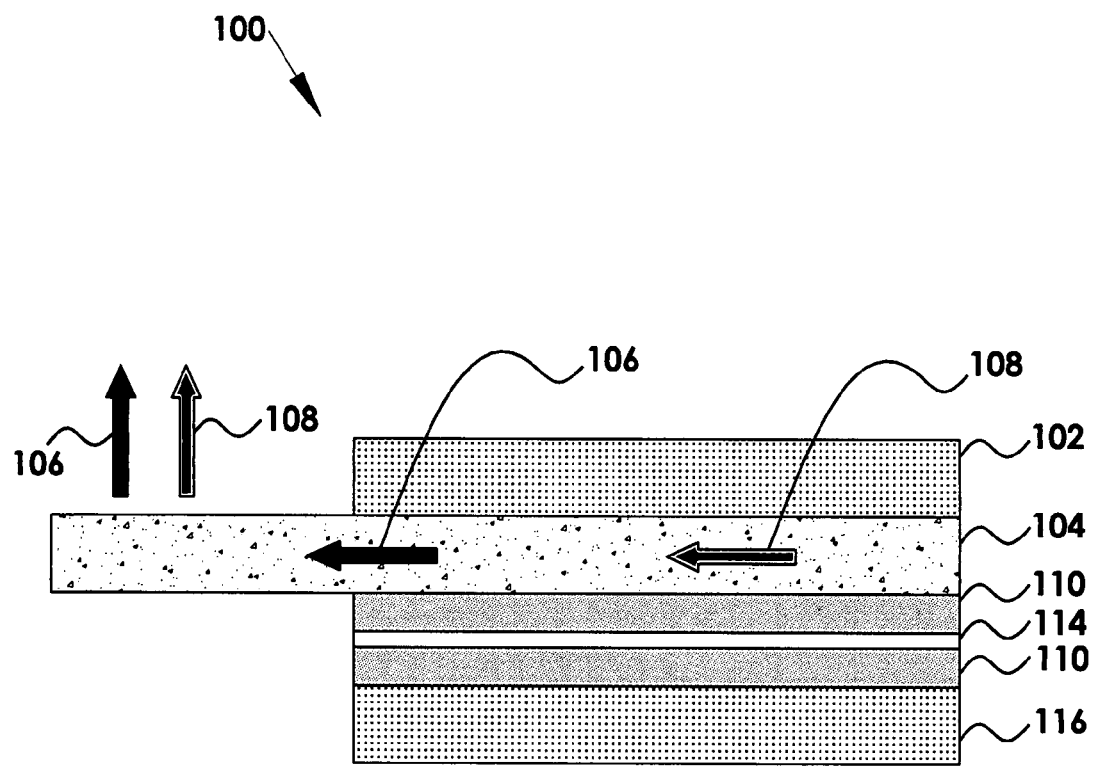
FIG. 1 shows a planar view of a schematic of a fuel cell having an integral heat and mass transfer element according to the present invention.

Referring to the figures, FIG. 1 shows a planar view of a schematic of a fuel cell 100 having an integral water and heat transfer element for simultaneous management of heat and water. A cathode current collector 102 is disposed on top of a heat and mass transport element 104 that transports water 106 and heat 108 from regions between a gas diffusion layer 110 and current collector 102 of the fuel cell 100 to locations outside of the fuel cell 100 assembly, where further shown are the proton exchange membrane (PEM) 114, another gas diffusion layer 110 and an anode current collector 116. Inside of the fuel cell 100 the water 106 generated at the cathode catalyst layer (not shown) is driven into the hydrophilic pores of the transport element 104 by surface tension forces. Outside of the fuel cell 100 the water 106 is removed from the transport element 104 by natural and/or forced convection driven evaporation from the surface of the transport element 104. The heat 108 is transferred from within the fuel cell 100 through the transport element 104 by conduction to the outside of the fuel cell 100 where it is removed from the transport element 104 by radiation and natural and/or forced convection. This device allows for efficient and compact redistribution, transient storage, and removal of excess water 106 and heat 108 from the cathode 102 or anode 116 reaction zones.

At least a portion of the transport element 104 is made from a material such as boron nitride, aluminum nitride, copper, aluminum, nickel, alloys, graphite, expanded graphite, graphite cloth, graphite paper, aluminum foam, stainless steel foam, nickel foam, polyvinyl alcohol foam, glass microfibers, wool cloth, cotton paper, cotton cloth, polyurethane foam, cellulose acetate, polyvinyl pyrrolidone, and polyacrylamide.

Figure 2:
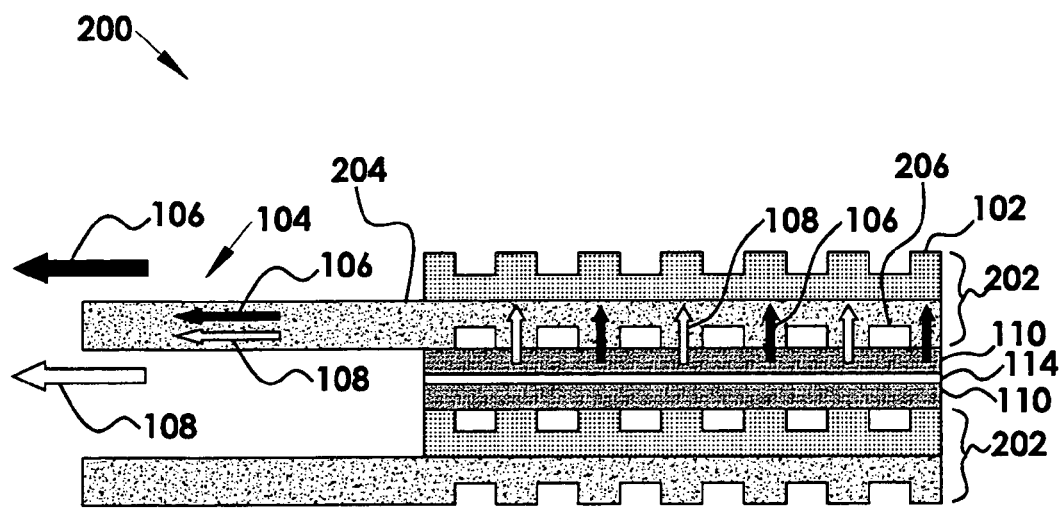
FIG. 2 shows a planar schematic view of a fuel cell stack having a heat and mass transfer element according to the present invention.

In one embodiment of the invention, the fuel cell can be a fuel cell stack or a planar fuel cell. FIG. 2 shows a planar schematic view of a fuel cell stack 200 according to one embodiment of the current invention. Here, the fuel cell stack 200 is shown having water 106 and heat 108 transported outside of the fuel cell assembly 200 in the direction parallel to the plane of the bipolar plates 202. The cathode half 204 of the bipolar plate is formed by the transport element 104 and therefore it is part of the electrical circuit. Additionally, the transport element 104 can include a liquid water transport structure such as channels inside the transport element 104, channels on a surface of the transport element 104, or an interconnected network of pores throughout the transport element 104. As shown in FIG. 2, the transport element 104 also forms the oxidant flow fields 206, that abut the gas diffusion layer 110. In one aspect of the invention, the transport element 104 can have a pattern of water permeable and gas impermeable barrier material impregnated to the transport element 104 that prevents communication of internal fuel cell gasses with ambient gasses (not shown). Such barrier patterns can be formed by a patterning process such as inkjet printing, screen printing, or masking. In one aspect, the barrier material can be a water permeable polymer.

FIG. 2 shows heat 108 and excess product water 106 rejected to the ambient environment by natural or forced convection outside of the stack 200. According to one aspect of the current invention, at least two of the transport elements 104 of the fuel cell stack 200 can be thermally and hydraulically coupled (not shown). In another aspect of the invention, the transport element 104 can transport water 106 from a cathode of the fuel cell to an anode of the fuel cell. Further, the transport element 104 can be integrated to an anodic current collector or a cathodic current collector.

Figure 3:
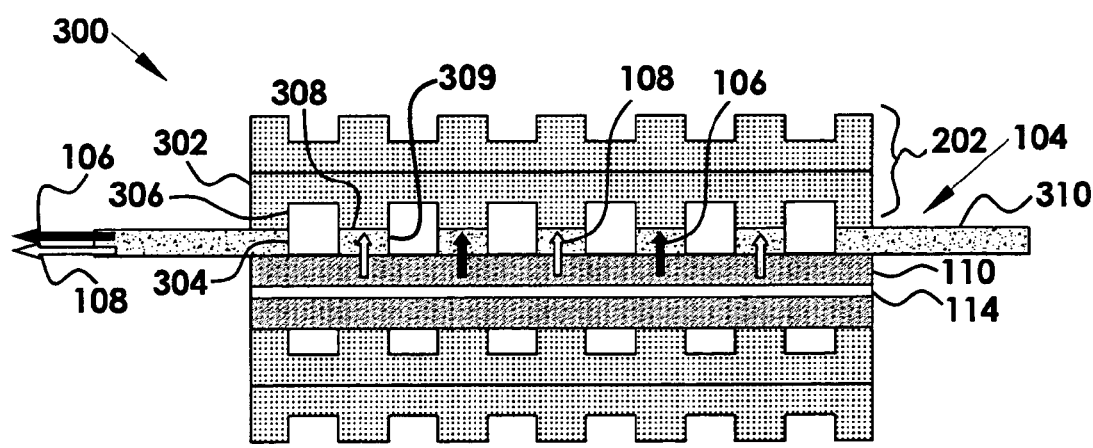
FIG. 3 shows a planar schematic view of an in-plane heat and water management device having a heat and mass transfer element according to the present invention.

FIG. 3 shows a planar schematic view of an in-plane heat and water management device 300 according to another embodiment of the current invention. The transport element 104 can be a separate layer disposed between layer pairs that may include an anodic gas diffusion layer and an anodic current collector layer pair, and a cathodic gas diffusion layer and a cathodic current collector layer pair. Further, at least part of the transport element layer 104 can be electrically conductive, where part of the element is electrically insulating. Additionally, the transport element layer 104 has at least one cutout in the layer 104, where the cutout enables gas communication through the layer 104 in a direction perpendicular to a plane of the layer 104. Further, the transport element layer 104 can have at least one hydrophobic region in the layer 104, where the hydrophobic region enables gas communication through the layer 104 in a direction perpendicular to a plane of the layer 104. The hydrophobic region can be formed by a patterning process such as inkjet printing, screen printing, or masking.

As shown in FIG. 3, the transport element 104 is formed by a separate layer between the gas diffusion layer 110 on the cathode side 302 and the bipolar plate 202. The transport element 104 contains through slots 304 aligned with the oxidant gas flow channels 306 of the bipolar plate 202 to facilitate oxidant mass transfer to the gas diffusion layer 110. Excess water that builds up on the surface of the GDL 110 near the cathode side 302 is wicked into the transport structure 104 once the water contacts the transport element 104. The liquid water 106 is then transported within the transport layer 104 by capillary forces, gravity, or external pressure gradients underneath the current collecting ribs 308 to the circumference of the cathode current collector 302 and then to the outside of the fuel cell stack 300, similar to the embodiment of FIG. 2. The fuel cell stack 300 with bipolar plates 202 and with the transport layer 104 between the cathode GDL 110 and the bipolar plate 202 provide in-plane transport of excess liquid water 106 and heat 108 in a fuel cell stack 300. The transport ribs 309 underneath of the cathode current collector rib 308 and the transport fins 310 protruding outside of the fuel cell stack 300 are in fluidic contact outside of the cross-section plane.

The transport element 104 may have a heat transport portion and a water transport portion. Additionally, the transport element 104 can form a part of a current collector flow field 306, where the current collector flow field can be an anodic flow field or a cathodic flow field.

Figure 4:
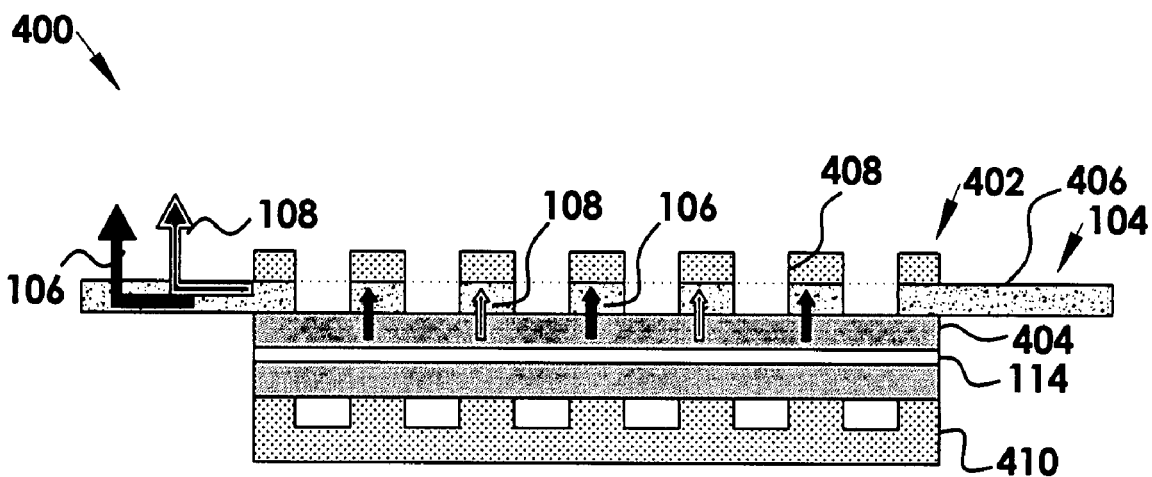
FIG. 4 shows a planar schematic view of a planar air-breathing cell having a heat and mass transfer element according to the present invention.

FIG. 4 shows a planar schematic view of a planar air-breathing cell 400. Here, the transport element 104 is a plate between an open air cathode current collector 402 and cathode GDL 404 implementing in-plane transport of excess liquid water 106 and heat 106. As discussed in embodiment of FIG. 2, the transport element 104 and the open-air cathode current collector 102 have cut-outs 408 (e.g. parallel slots, rectangular openings). However, according to the embodiment of FIG. 4, the transport element 104 extends beyond the circumference of the cathode current collecting plate 402 and thus exposes the transport plate 104 to ambient air at the circumference of the cell 400, where the heat 108 and water 106 removal from the transport plate 104 occurs. The transport plate 104 is part of the electrical circuit and in direct contact with the cathode GDL 404 without obstructing current or airflow to the cathode current collector plate 402, where also shown is the PEM 114 and the anode plate 410. Excess water 106 that comes into contact with the transport layer 104 is transported by capillary forces or gravity underneath of the cathode current collector plate 402 towards the edge of the transport plate 104 where it evaporates or seeps out in liquid form. Similarly, heat 108 is removed from the surface of the cathode plate 402 by heat conduction to the outside fins 406 where it is transferred to ambient by convection and radiation.

Figure 5:
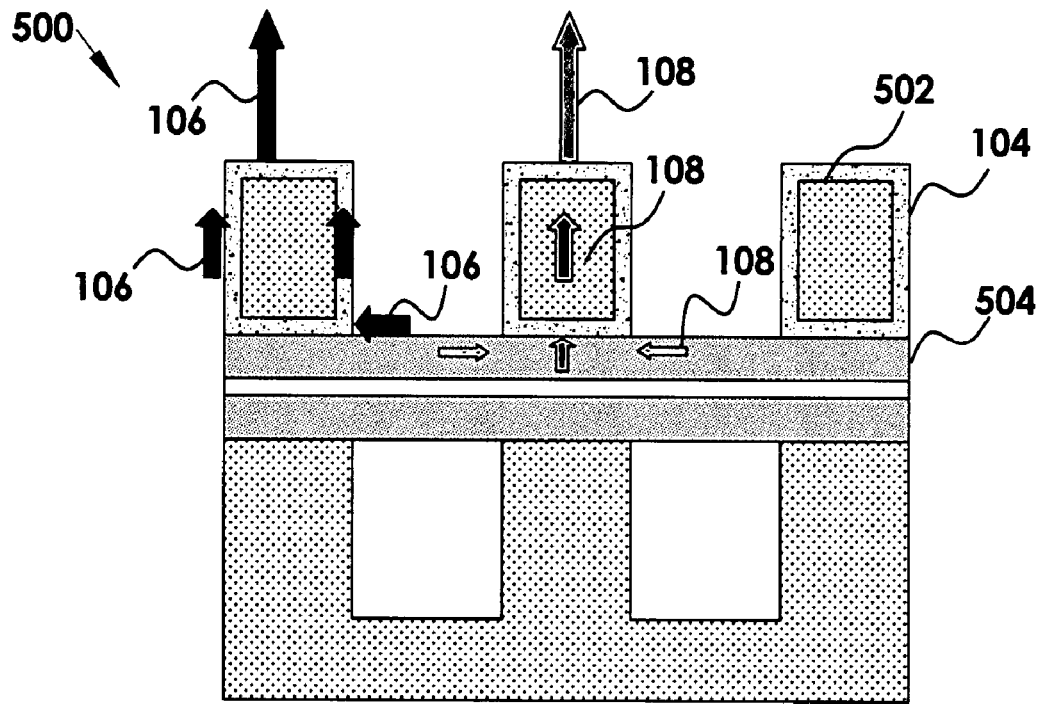
FIG. 5 shows a planar schematic view of a heat and mass transfer element envelopment embodiment of an air-breathing fuel cell according to the present invention.

FIG. 5 shows a planar schematic view of an transport envelopment embodiment 500 off an air-breathing fuel cell, where the transport element 104 is a layer formed on the surface of the cathode current collectors 502, where the transport element 104 is an electrically conductive, hydrophilic wicking layer that acts as a water transport medium. The excess water 106 that builds up at the surface of the cathode GDL 504 is wicked into the surface layer of the cathode current collector and evaporates into ambient.

The transport element 104 of the current invention serves several purposes such as allowing the redistribution of liquid water products along the reaction surfaces without blocking them and hence reducing local dry-out effects. The element 104 acts as a transient storage of product water 106 and thus allows for cell load profiles with load peaks without flooding. Additionally, it allows for heat 108 and water 106 removal outside of the cell stack thus simplifying the heat and water management.

Figure 6:
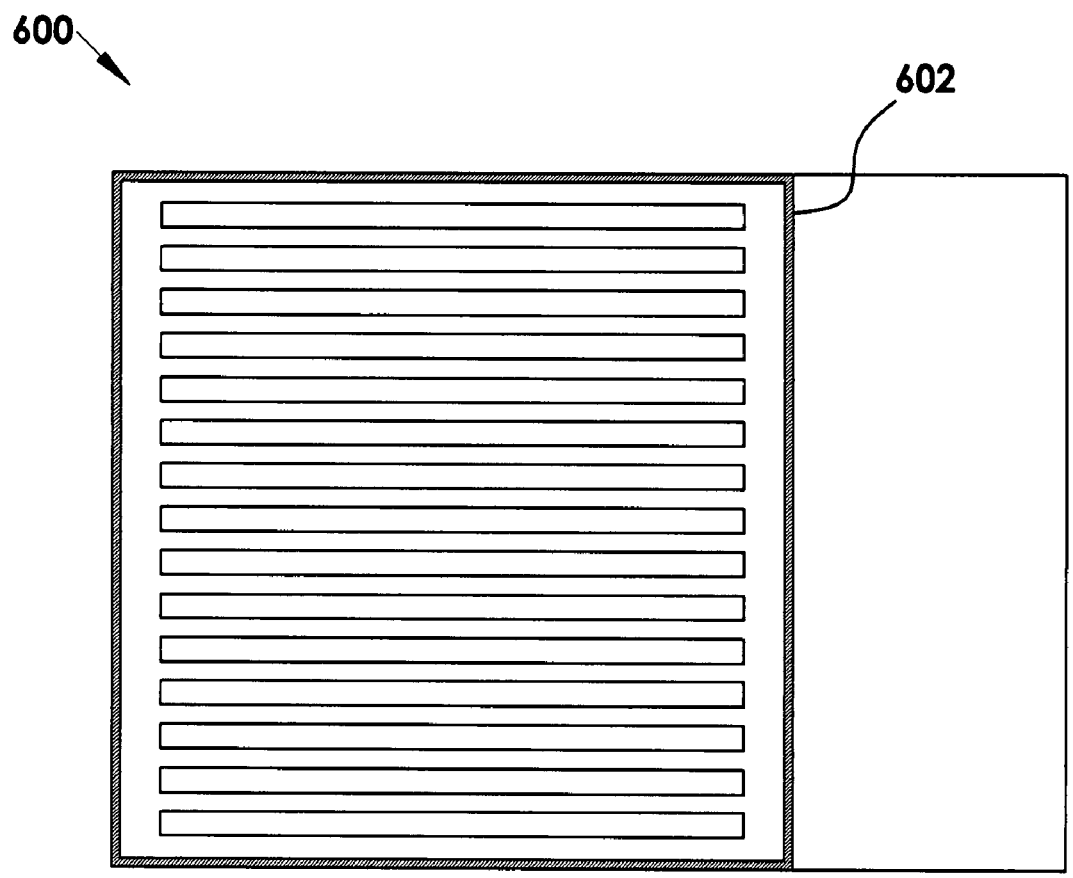
FIGS. 6(a)-(b) show a heat and water transport device having a gas impermeable barrier according to the present invention.
Figure 6:
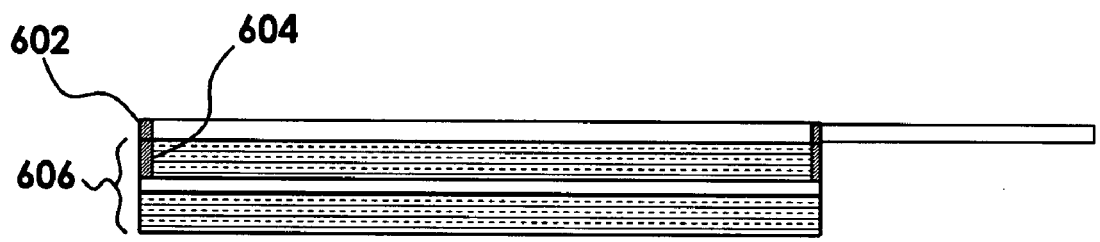

FIGS. 6(a) and 6(b) show a heat and water transport device 600 having a gas impermeable barrier 602 according to one embodiment of the invention, where the barrier 602 that prevents communication of gasses between a fuel cell flow field (not shown) and ambient environment. Here, the water permeable, gas impermeable barrier 602 in the heat and water transport device 600 is formed preferentially in areas of a layer in contact with the gas seals 604 of the adjacent membrane electrode assembly layer 606. The gas impermeable barrier 602 is formed by impregnating sections and/or surfaces of the heat and mass transfer device 600 with water permeable and gas impermeable barrier material.

FIGS. 7(a) and 7(b) show a combined hydrophilic and hydrophobic transport element 700, where shown are alternating stripes of hydrophilic 702 and hydrophobic 704 regions, where the hydrophilic regions 702 allow for water transport 712, and the hydrophobic regions 704 allow for the air flow 710. FIG. 7(b) shows a perspective schematic view of the combined hydrophilic and hydrophobic transport element 700 in contact with a membrane electrode assembly 706. Water 712 is generated at the catalyst layer of the membrane electrode assembly 706 between membrane and the cathode gas diffusion layer 110 where the membrane electrode assembly 706 includes a membrane disposed between two catalyst layers. The liquid water 712 travels by capillary flow through the gas diffusion media 110 to the interface with the transport element 700. The hydrophobic nature of the hydrophobic regions 704 within the transport element 700 effectively prevents any liquid water 712 from penetrating into the region 704 and the liquid water 712 is transported only within the hydrophilic phase 702 of the transport layer 702. Consequently, oxygen 710 from air flow channels interfacing the transport layer 700 can freely diffuse towards the catalyst layer through the hydrophobic regions 704 unobstructed from liquid water 712.

Figure 7:
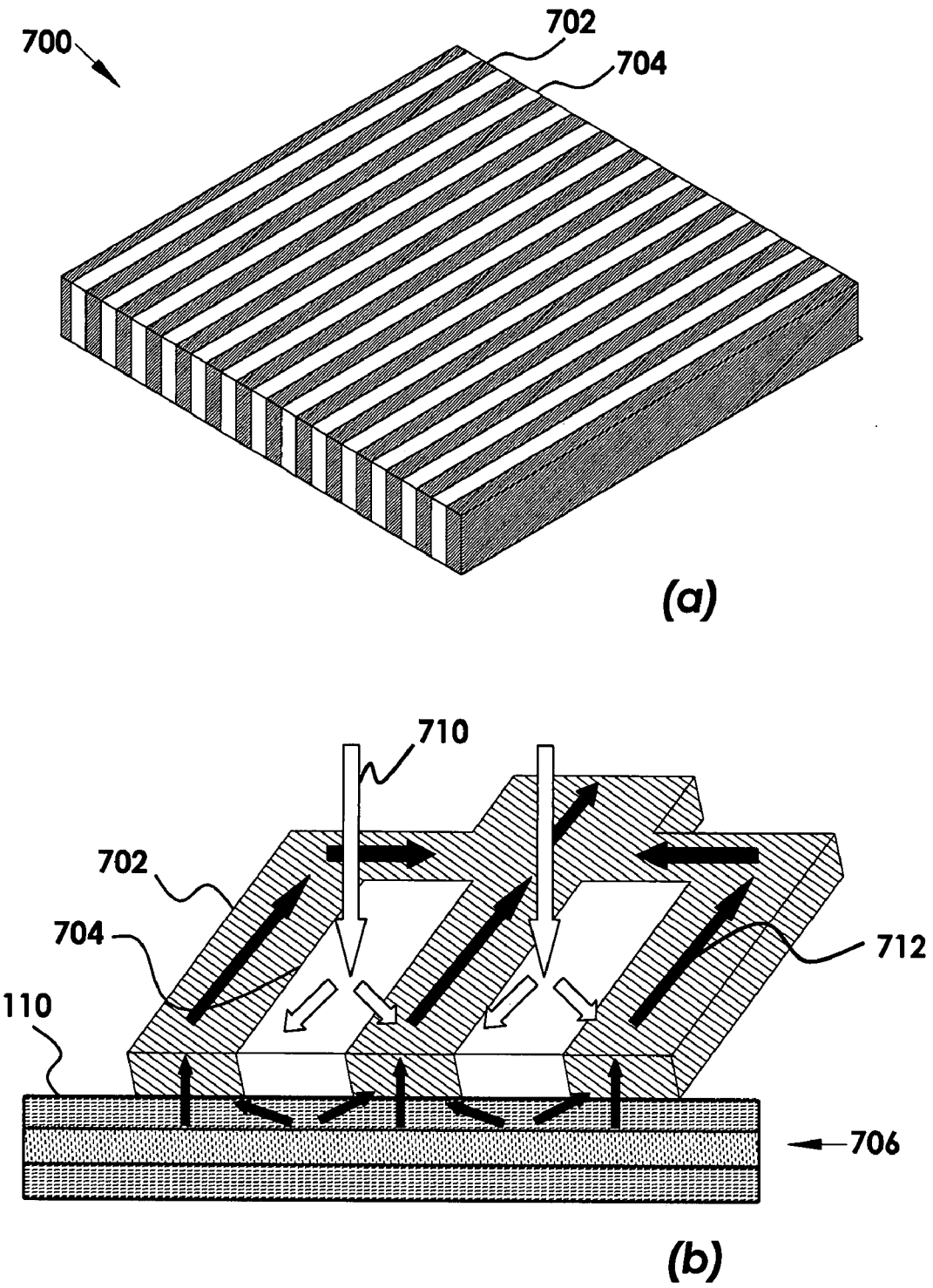
FIGS. 7(a)-(b) show a combined hydrophilic and hydrophobic transport element according to the present invention.
Figure 8:
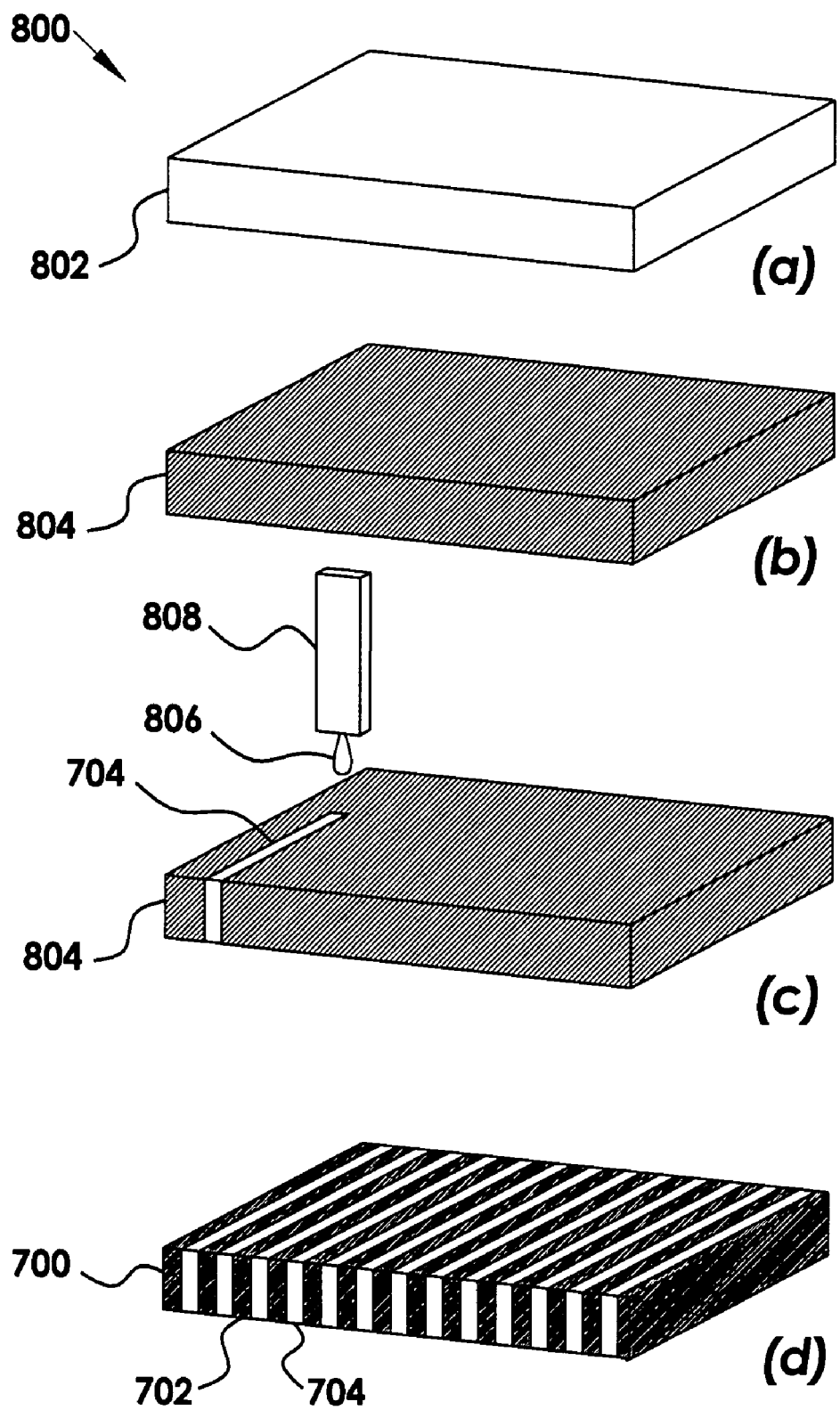
FIGS. 8(a)-(d) show perspective schematic views of the example fabrication steps for creating the striped pattern of FIG. 7(a) according to the present invention.

FIGS. 8(a)-8(d) show perspective schematic views of the example fabrication steps 800 for creating the striped pattern of FIG. 7(a), where FIG. 8(a) shows carbon paper 802 that is initially in hydrophobic state. FIG. 8(b) shows hydrophilic carbon paper 804 after heat treatment, where the heat treatment can be exposure to 350° C. air for about 5 minutes. FIG. 8(c) shows the addition of a Teflon solution 806 using ink-jet patterning 808 to create a hydrophobic strip 704 in the hydrophilic carbon paper 804. FIG. 8(d) shows the combined hydrophilic and hydrophobic transport element 700 of FIG. 7(a). It should be obvious that other methods such as screen printing, masking, injection molding, powder pressing, gaseous synthesis, oxidation and mechanical pressing could be used to achieve similar results.

Figure 9:
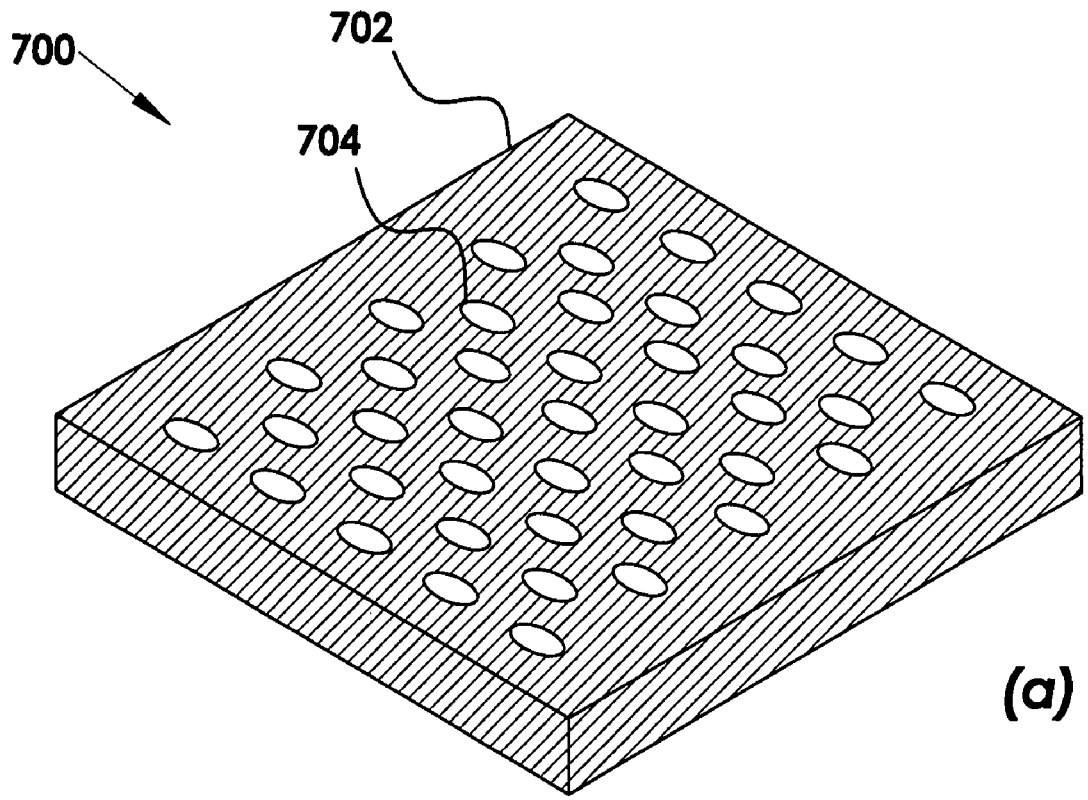
FIGS. 9(a)-(b) show other possible embodiments of the combined hydrophilic and hydrophobic transport element of FIG. 7 according to the present invention.
Figure 9:
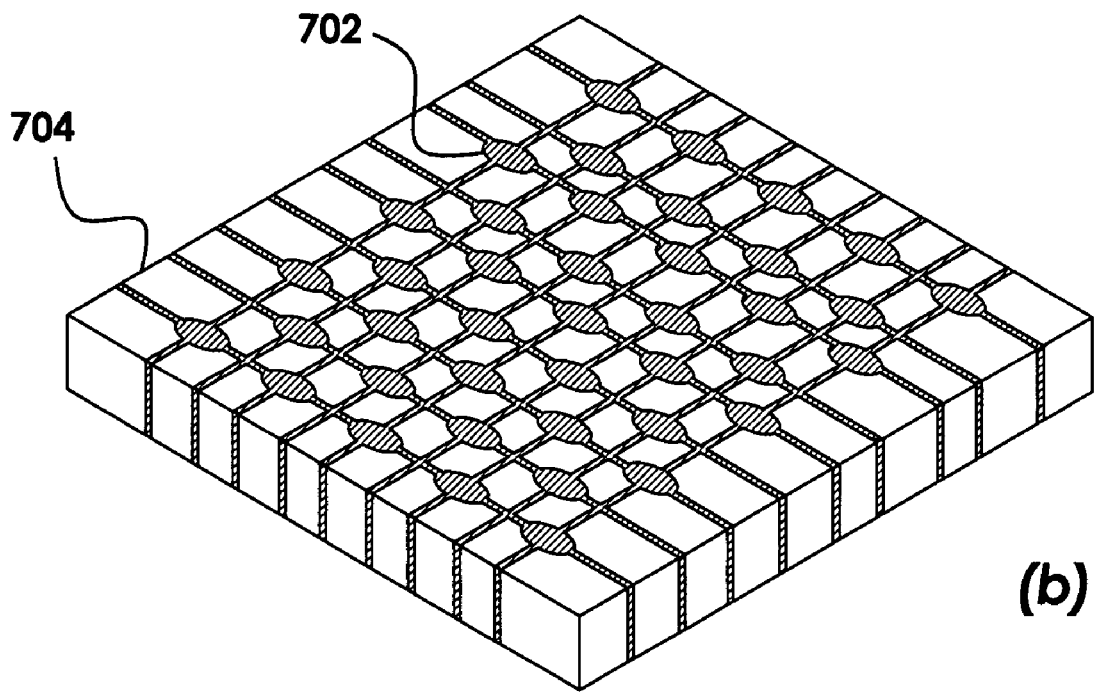

FIGS. 9(a) and 9(b) show other possible embodiments of the combined hydrophilic and hydrophobic transport element 700 of FIG. 7, where FIG. 9(a) shows the hydrophobic regions to be a pattern of spots across a larger hydrophilic region 704. FIG. 9(b) shows a combined grid-like and spot pattern of hydrophilic regions 702 across a larger hydrophobic region 704. It should be obvious that many patterns are possible without detracting from the essence of this embodiment.

Figure 10:
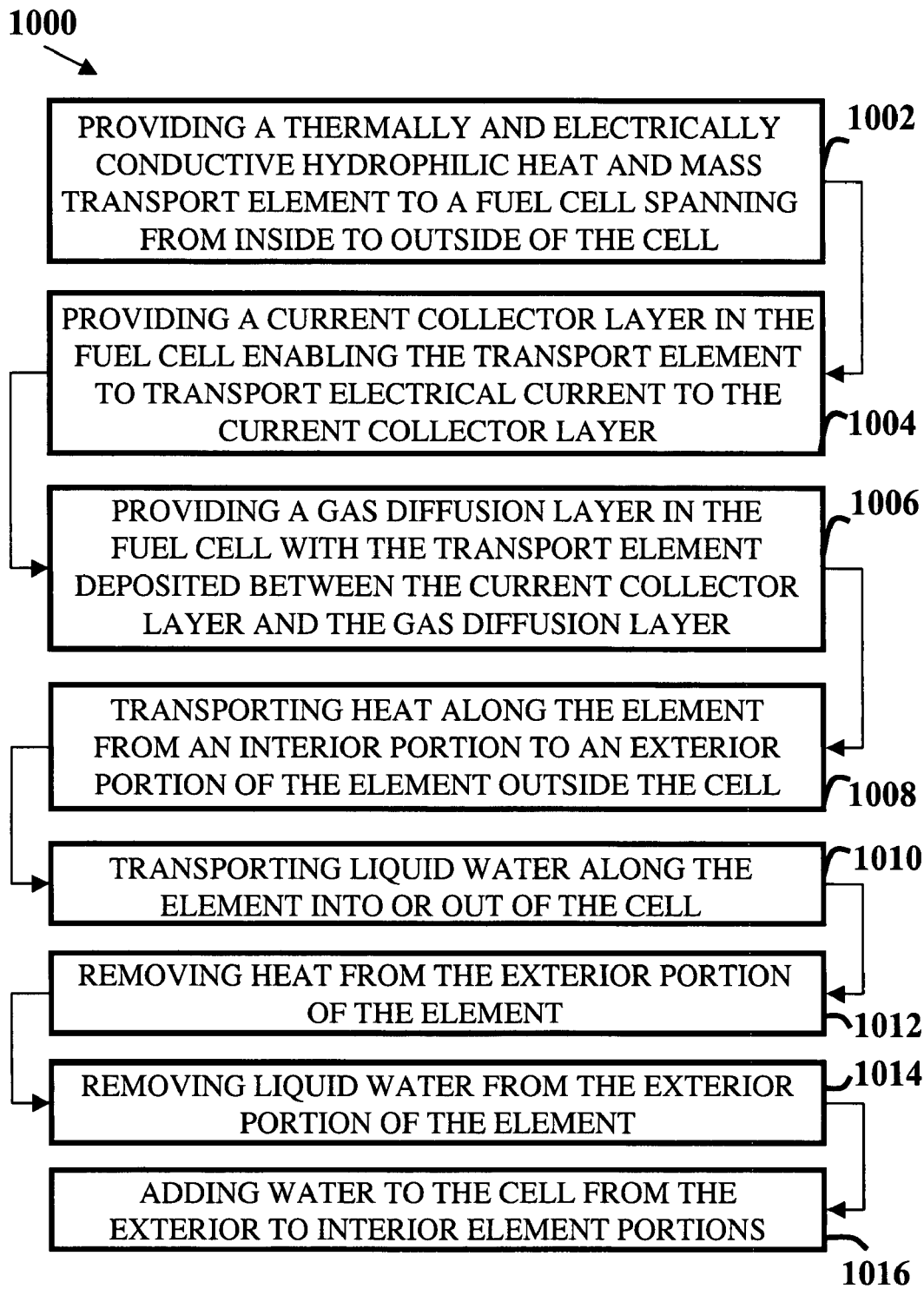
FIG. 10 shows the steps of a method of in-plane fuel cell heat and water management according to the present invention.

FIG. 10 shows the steps of a method of in-plane fuel cell heat and water management 1000. The steps include providing a thermally and electrically conductive hydrophilic heat and mass transport element to the fuel cell 1002, wherein the transport element spans from inside of the cell to outside of the cell. The steps further include providing a current collector layer in the fuel cell 1004, where the transport element transports electrical current to the current collector layer. The method include providing a gas diffusion layer in the fuel cell 1006, where the transport element is deposited between the current collector layer and the gas diffusion layer. Heat is transported along the transport element from an interior portion of the element inside the cell to an exterior portion of the element outside the cell 1008. Further, liquid water is transported along the element into or out of the cell 1010. Heat is removed from the exterior portion 1012 by any combination of radiation, free convection and forced convection, and the liquid water is removed from the exterior portion 1014 by any combination of convection driven evaporation and advection. The water is added to the cell from the exterior portion to the interior portion 1016 by any combination of advection and capillary wicking.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example numerous metallic and non-metallic porous materials could produce the desired electrically and thermally conductive and hydrophilic wicking structure. Material candidates include carbon foams and carbon based composites. Carbon based composites are fabricated using either thermoset or thermoplastic resins with a carbon/graphite filler and in some cases a fiber reinforcement included. These materials can be manufactured with a given porosity using pore forming agents. Alternatively, electrically and thermally conductive water wicking layers can be realized on metallic surfaces by techniques utilized inside heat pipes e.g. sintered metal particles, surface grooves, screens, etc.

The combination of heat and water transfer structures into a single integral element located directly at the cathode surface opens possibilities for a very compact solution to the heat and mass transfer management problem encountered in fuel cells. The aspects of the current invention offer several advantages over the state of the art, where the transport element 104 can be built with materials already used in fuel cells (e.g. carbon paper) with minor modification (hydrophilic treatment) hence limiting danger of contamination. Further, the invention can be implemented in existing stacks with minimum modification, e.g. by adding an additional layer. Finally, invention can be used in passive as well as active systems. All such variations are considered to be within the scope and spirit of the present invention as defined by the following claims and their legal equivalents.

What is claimed is:

1. A method of in-plane fuel cell heat and water management comprising;

a. providing a thermally and electrically conductive hydrophilic heat and mass transport element layer to said fuel cell, wherein said transport element layer spans from inside of said cell to an ambient environment outside of said cell;

b. providing a current collector layer in said fuel cell, wherein said transport element layer transports electrical current to said current collector layer; and c. providing a gas diffusion layer in said fuel cell, wherein said transport element layer comprises at least one through slot and at least one transport rib, wherein said transport element layer is disposed between said gas diffusion layer on a cathodic side of said fuel cell and a bipolar plate, wherein said transport layer facilitates oxidant mass transport to said gas diffusion layer, wherein said bipolar plate comprises at least one gas channel and at least one current collecting rib, wherein said at least one transport rib aligns with said at least one current collecting rib, wherein said at least one through slot aligns with said at least one gas channel, wherein said transport element enables use of capillary forces to confine gas flow parallel to said at least one gas channel and receives liquid transport along a direction transverse to the direction of heat and mass transport of said hydrophilic heat and mass transport element, whereby heat is transported along said transport element layer from an interior portion of said transport element layer inside said cell to an exterior portion of said transport element layer disposed in said ambient environment outside said cell, and whereby liquid water is transported along said transport element layer into or out of said cell, whereas heat is removed from said exterior portion of said transport element layer in said ambient environment by any combination of radiation, free convection and forced convection, and whereas said liquid water is removed from said exterior portion of said transport element layer in said ambient environment by any combination of convection driven evaporation and advection, wherein said water is added to said cell from said exterior portion of said transport element layer in said ambient environment to said interior portion of said transport element layer by any combination of advection and capillary wicking.

2. The heat and water management method of claim 1, wherein said fuel cell is selected from a group consisting of a fuel cell stack and a planar fuel cell.

3. The heat and water management method of claim 2, wherein at least two said transport element layers of said fuel cell stack are thermally and hydraulically coupled.

4. The heat and water management method of claim 1, wherein at least a portion of said transport element layer is made from a material selected from a group consisting of boron nitride, aluminum nitride, copper, aluminum, nickel, alloys, graphite, expanded graphite, graphite cloth, graphite paper, aluminum foam, stainless steel foam, nickel foam, polyvinyl alcohol foam, glass microfibers, wool cloth, cotton paper, cotton cloth, polyurethane foam, cellulose acetate, polyvinyl pyrrolidone, and polyacrylamide.

5. The heat and water management method of claim 1, wherein said transport element layer further comprises a pattern of water permeable and gas impermeable barrier material impregnated to said transport element layer that prevents communication of internal fuel cell gasses with ambient gasses.

6. The heat and water management method of claim 5, wherein said barrier pattern is formed by a patterning process selected from a group consisting of inkjet printing, screen printing, and masking.

7. The heat and water management method of claim 5, wherein said barrier material is a water permeable polymer.

8. The heat and water management method of claim 1, wherein said transport element layer is a separate layer, whereby said separate layer is disposed between layer pairs selected from a group consisting of an anodic gas diffusion layer and an anodic current collector layer pair, and a cathodic gas diffusion layer and a cathodic current collector layer pair.

9. The heat and water management method of claim 8, wherein at least part of said transport element layer is electrically conductive, whereby part of said element is electrically insulating.

10. The heat and water management method of claim 8, wherein said transport element layer comprises at least one cutout in said transport element layer, whereby said cutout enables gas communication through said layer in a direction perpendicular to a plane of said layer.

11. The fuel cell heat and water management method of claim 1, wherein said transport element layer is integrated to a current collector, whereby said current collector is selected from a group consisting of an anodic current collector and a cathodic current collector.

12. The heat and water management method of claim 1, wherein said layer comprises a heat transport portion and a water transport portion.

13. The heat and water management method of claim 12, wherein said transport element layer forms a part of a current collector flow field, whereby said current collector flow field is selected from a group consisting of an anodic flow field and a cathodic flow field.

14. The heat and water management method of claim 1, wherein said transport element layer transports water from a cathode of said fuel cell to an anode of said fuel cell.

15. An in-plane fuel cell heat and water management device comprising:

a. a thermally and electrically conductive hydrophilic heat and mass transport element layer, wherein said transport element layer spans from inside of said cell to an ambient environment outside of said cell;

b. a current collector layer in said fuel cell, wherein said transport element layer transports electrical current to said current collector layer; and c. a gas diffusion layer in said fuel cell, wherein said transport element layer comprises at least one through slot and at least one transport rib, wherein said transport element layer is deposited between said gas diffusion layer on a cathodic side of said fuel cell and a bipolar plate, wherein said bipolar plate comprises at least one gas channel, and at least one current collecting rib, wherein said at least one transport rib aligns with said at least one current collecting rib, wherein said at least one through slot aligns with said at least one gas channel, wherein said transport element layer enables use of capillary forces to confine gas flow parallel to said at least one gas channel and receives liquid transport along a direction transverse to the direction of heat and mass transport of said hydrophilic heat and mass transport element layer, whereby heat is transported along said transport element layer from an interior portion of said element inside said cell to an exterior portion of said element disposed in said ambient environment outside said cell, and whereby liquid water is transported along said transport element layer into or out of said cell, whereas heat is removed from said exterior portion of said transport element layer by any combination of radiation, free convection and forced convection, and whereas said liquid water is removed from said exterior portion of said transport element layer by any combination of convection, driven evaporation and advection, wherein said water is added to said cell from said exterior portion to said interior portion of said transport element layer in said ambient environment to said interior portion of said transport element layer by any combination of advection and capillary wicking.

16. The heat and water management device of claim 15, wherein said transport element layer further comprises a pattern of water permeable and gas impermeable barrier material impregnated to said transport element layer that prevents communication of internal fuel cell gasses with ambient gasses, wherein said barrier pattern is formed by a patterning process selected from a group consisting of inkjet printing, screen printing, and masking.

* * * * *